US012168289B2

(12) United States Patent
Franz et al.

(10) Patent No.: US 12,168,289 B2
(45) Date of Patent: Dec. 17, 2024

(54) POWER TOOL

(71) Applicant: Hilti Aktiengesellschaft, Schaan (LI)

(72) Inventors: Karl Franz, Oppenweiler (DE); Dennis Muentener, Klosters Dorf (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/276,544

(22) PCT Filed: Mar. 10, 2022

(86) PCT No.: PCT/EP2022/056152
§ 371 (c)(1),
(2) Date: Aug. 9, 2023

(87) PCT Pub. No.: WO2022/200057
PCT Pub. Date: Sep. 29, 2022

(65) Prior Publication Data
US 2024/0100679 A1 Mar. 28, 2024

(30) Foreign Application Priority Data
Mar. 25, 2021 (EP) .................................... 21165082

(51) Int. Cl.
*B25F 5/02* (2006.01)
*B25F 3/00* (2006.01)
(Continued)

(52) U.S. Cl.
CPC .................. *B25F 5/02* (2013.01); *B25F 3/00* (2013.01); *B21J 15/105* (2013.01); *B25B 23/06* (2013.01); *B25C 1/001* (2013.01); *B25D 16/00* (2013.01)

(58) Field of Classification Search
None
See application file for complete search history.

(56) References Cited

U.S. PATENT DOCUMENTS 5,185,992 A 2/1993 Garcia
9,694,428 B2 7/2017 Tussing
(Continued)

FOREIGN PATENT DOCUMENTS

DE 10 2013 213 804 A1 5/2014
EP 3 338 958 A1 6/2018

OTHER PUBLICATIONS

European Patent Office, International Search Report and Written Opinion issued in International Patent Application No. PCT/EP2022/056152, mailed on Jun. 24, 2022.

*Primary Examiner* — Tanzim Imam
(74) *Attorney, Agent, or Firm* — Leydig, Voit & Mayer, Ltd.

(57) ABSTRACT

A power tool, comprising first and second module, removable from the first module, the first and second modules being insertable into one another along an insertion axis defining an insertion direction, the first module having a pressing inhibiting element, moved along with the second module, and a pressing blocking element, the inhibiting element being turnable with respect to the blocking element about the insertion axis between normal and detaching positions, the second module being held against the first module in the normal position and removable from the first module in the detaching position, the blocking element allowing the inhibiting element to be transferred along the insertion axis toward the first module into a pressing position when the inhibiting element is in the normal position, the blocking element blocking the insert fitting from being transferred into the pressing position when the inhibiting element is in the detaching position.

20 Claims, 3 Drawing Sheets

(51) Int. Cl.

| | |
|---|---|
| *B21J 15/10* | (2006.01) |
| *B25B 23/06* | (2006.01) |
| *B25C 1/00* | (2006.01) |
| *B25D 16/00* | (2006.01) |

(56) References Cited

U.S. PATENT DOCUMENTS

| | | | | |
|---|---|---|---|---|
| 11,370,101 | B2 | 6/2022 | Fielitz | |
| 2015/0115554 | A1 | 4/2015 | Tussing | |
| 2019/0329396 | A1* | 10/2019 | Fielitz | B25F 3/00 |

* cited by examiner

POWER TOOL

CROSS-REFERENCE TO RELATED APPLICATIONS

This patent application is the U.S. National Stage of International Patent Application No. PCT/EP2022/056152, filed Mar. 10, 2022, which claims the benefit of European Patent Application No. 21165082.5, filed Mar. 25, 2021, which are each incorporated by reference.

BACKGROUND OF THE INVENTION

The invention relates to a power tool consisting of a number of modules that can be removed from one another, such as for example a setting tool for setting fastening elements such as nails, bolts, rivets, screws or anchors, or a hammer drill.

BRIEF SUMMARY OF THE INVENTION

Power tools which each comprise a first module and a second module that can be removed from the first module are known from the prior art. It is known to provide the first module with a thread and the second module with a mating thread, so that the second module can be unscrewed from the first module. However, this is time-consuming. There are also known power tools that can only be activated when they have been pressed against a substrate or a workpiece.

The object of the invention is to provide a power tool in which a first module can be quickly and/or reliably removed from a second module.

SUMMARY OF THE INVENTION

According to one aspect of the application, a power tool comprises a first module and a second module, which can be removed from the first module, wherein the first and second modules can be inserted into one another along an insertion axis defining a direction of insertion, wherein the first module has a pressing inhibiting element, which is moved along with the second module, and a pressing blocking element, wherein the pressing inhibiting element can be turned with respect to the pressing blocking element about the insertion axis between a normal position and a detaching position, wherein the second module is held against the first module in the normal position and can be removed from the first module in the detaching position, wherein the pressing blocking element allows the pressing inhibiting element to be transferred along the insertion axis toward the rest of the first module into a pressing position when the pressing inhibiting element is in the normal position, whereas the pressing blocking element blocks the insert fitting from being transferred into the pressing position when the pressing inhibiting element is in the detaching position, and wherein the first module has a latching mechanism, which brings about latching engagement of the pressing inhibiting element in the detaching position when the second module is removed from the first module. It is in this way ensured that the pressing inhibiting element remains in the detaching position, and as a result the pressing blocking element blocks the pressing inhibiting element from being transferred into the pressing position when the second module has been removed from the first module. This prevents inadvertent activation of the first module during repair or cleaning of the power tool.

An advantageous embodiment is characterized in that the latching mechanism comprises a latching element on the rest of the first module and a latching fitting on the pressing inhibiting element, or vice versa, and wherein the latching element engages in the latching fitting in order to bring about latching engagement of the pressing inhibiting element in the detaching position. Preferably, the latching mechanism comprises a latching spring, which loads the latching element toward the latching fitting. Likewise preferably, the second module has a covering element, which covers the latching fitting in order to prevent engagement of the latching element in the latching fitting when the second module is held against the first module. Particularly preferably, the covering element is formed as a driver, which engages in the latching fitting in order to transfer a rotational movement of the second module about the insertion axis onto the pressing inhibiting element when the second module is held against the first module.

An advantageous embodiment is characterized in that the first module has an insert fitting and the second module has an insert part that can be inserted into the insert fitting along the insertion axis, or vice versa. Preferably, the insert part in the insert fitting can be turned in a direction of rotation about the insertion axis between an inhibiting position and a passing position, wherein the insert fitting has one or more first projections, following one another in the direction of insertion, and the insert part has one or more second projections, following one another in the direction of insertion, wherein in the inhibiting position a second projection respectively engages behind a first projection in the direction of the insertion axis, and wherein in the passing position the first projection or projections allow(s) the respective second projection or projections to pass in the direction of the insertion axis.

An advantageous embodiment is characterized in that the pressing inhibiting element has a pressing inhibiting contour, the movement of which along the insertion axis is blocked by the pressing blocking element when the pressing inhibiting element is in the detaching position.

An advantageous embodiment is characterized in that the pressing inhibiting element comprises a sleeve arranged around the insertion axis.

An advantageous embodiment is characterized in that the power tool has a driving-in element for transferring energy to a fastening element to be driven in, and a power-operated driving device for driving the driving-in element. Preferably, the first module comprises the driving device, the driving-in element, a guiding cylinder for the driving-in element and/or an operating element. Likewise preferably, the second module comprises the driving-in element, a guiding cylinder for the driving-in element, an operating element and/or a magazine for the fastening element.

Further features and advantages of the invention will become apparent from the exemplary embodiments, which are explained in more detail in the following text with reference to the appended drawings.

DESCRIPTION OF THE EMBODIMENTS

Figure 1:
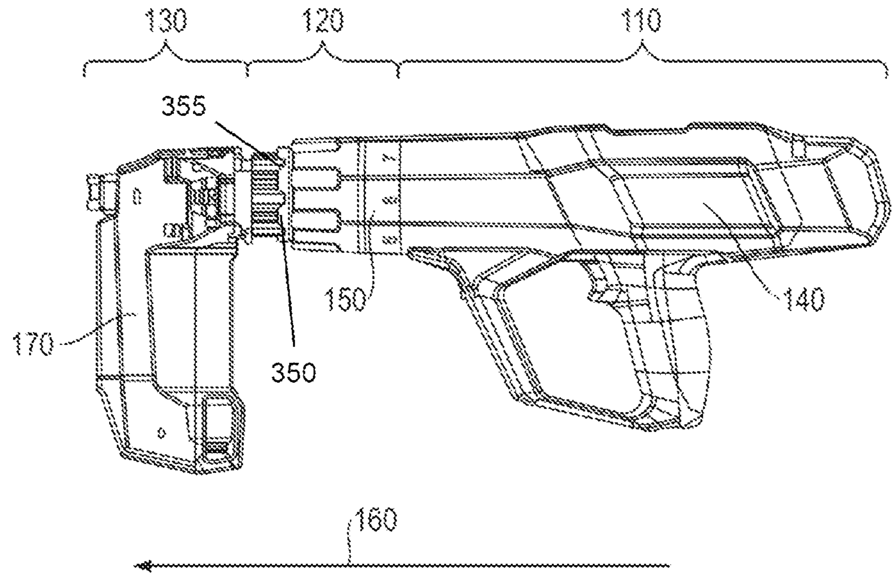
FIG. 1 shows a power tool in a side view.

FIG. 1 shows a first exemplary embodiment of a power tool 100 in a side view. The power tool 100 comprises a drive module 110, an energy setting module 120 and a magazine module 130, wherein the magazine module 130 is removably inserted in the energy setting module 120, and wherein the energy setting module 120 is removably inserted in the drive module 110. In exemplary embodiments that are not shown, for example the drive module is inserted in the energy setting module or the energy setting module is inserted in the magazine module.

The power tool 100 is formed as a setting tool for setting fastening elements that are not shown, such as nails, bolts, rivets and the like, and comprises a driving-in element that is not shown, formed for example as a setting ram, for transferring energy to a fastening element to be driven in, and a power-operated drive device that is not shown, for driving the driving-in element. The first module 110 comprises a housing 140, the drive device, held in the housing 140, and a guiding cylinder, likewise held in the housing 140, for the driving-in element. The second module 120 comprises an operating element 150 and the magazine module 130 comprises a driving-in channel, in which a fastening element is driven by the driving-in element in a setting direction 160 into a substrate that is not shown, for example of steel, concrete or wood, and also a magazine 170 for feeding fastening elements into the driving-in channel.

The drive device comprises for example a powder- or gas-operated combustion chamber, a compressed-air-operated pressure chamber, a mechanical or pneumatic drive spring, or an electrically operated flywheel. With the operating element 150, driving-in energy to be transferred to the fastening element can be set.

Figure 2:
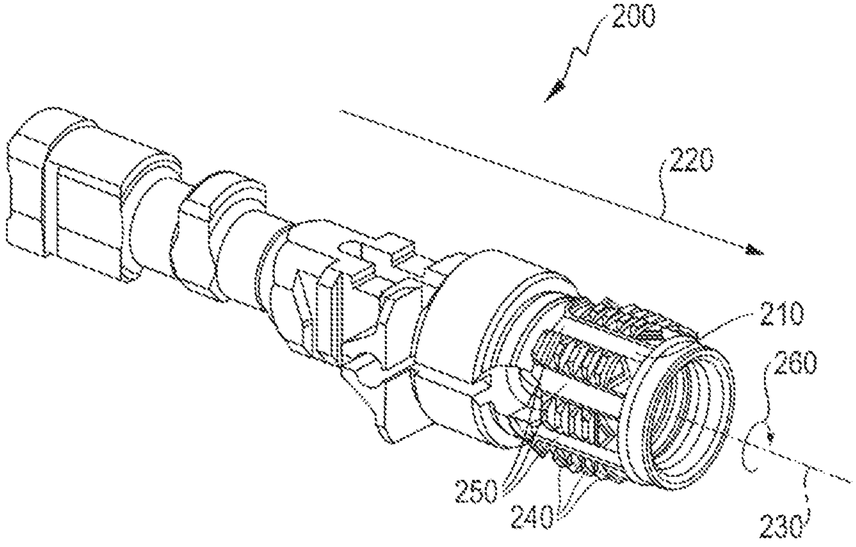
FIG. 2 shows a detail of a module of a power tool.
Figure 3:
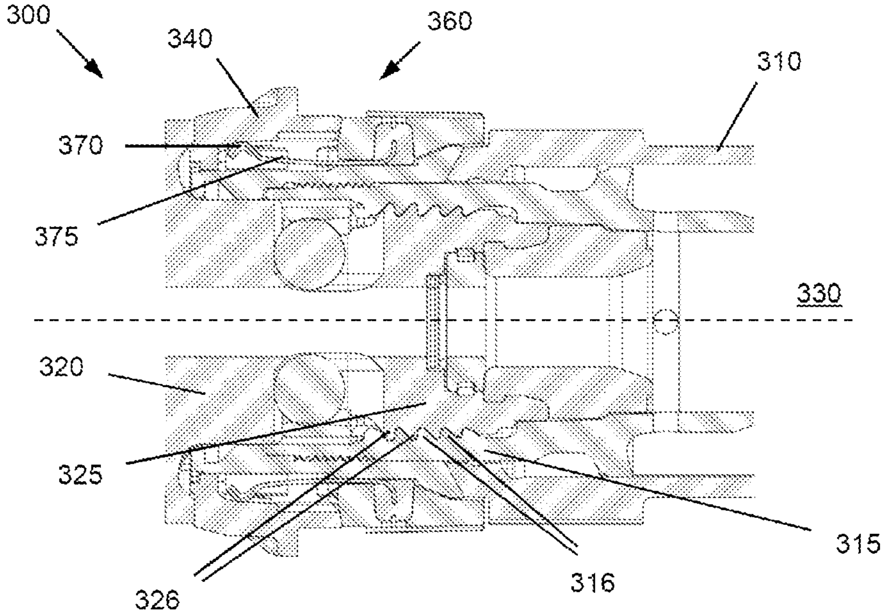
FIG. 3 shows a detail of a power tool in a normal position in a longitudinal section.

FIG. 2 has a magazine module 200 with a magazine that is not shown. The magazine module 200 comprises an insert part 210, which can be inserted along an insertion axis 230, defining a direction of insertion 220, into an insert fitting of the first module 110. The insert part 210 has a number of second projections 240, following one another in the direction of insertion 220 and intended for respectively engaging behind a first projection of the insert fitting in an inhibiting position of the insert part 210 with respect to the insert fitting. In a circumferential direction around the insertion axis 230, the insert part 210 has between the second projections 240 second intermediate spaces 250, which are intended for allowing the first projections of the insert fitting to pass along the insertion axis 230 in a passing position of the insert part 210 with respect to the insert fitting. In this case, the insert part 210 can be turned in the insert fitting in a direction of rotation 260 about the insertion axis 230 between the inhibiting position and the passing position. The two projections 240 are arranged one behind the other in the direction of insertion 220 and one next to the other in the direction of rotation 260. In the present exemplary embodiment, the second intermediate spaces 250 are offset in relation to one another by 45° in each case along the direction of rotation 260, so that altogether eight different passing positions are provided along a circumferential direction around the insertion axis 230.

Figure 4:
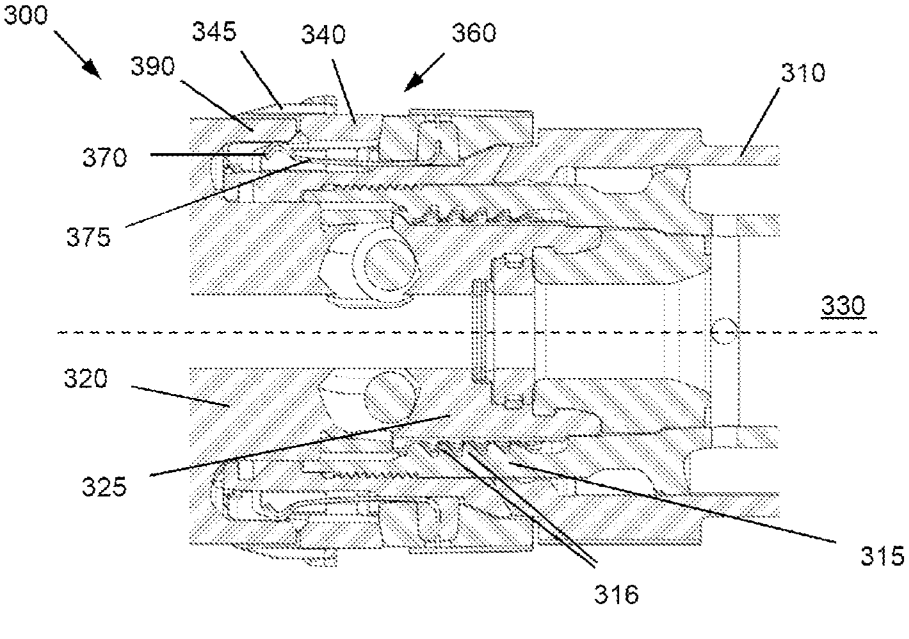
FIG. 4 shows the detail of the power tool from FIG. 3 in a detaching position.
Figure 5:
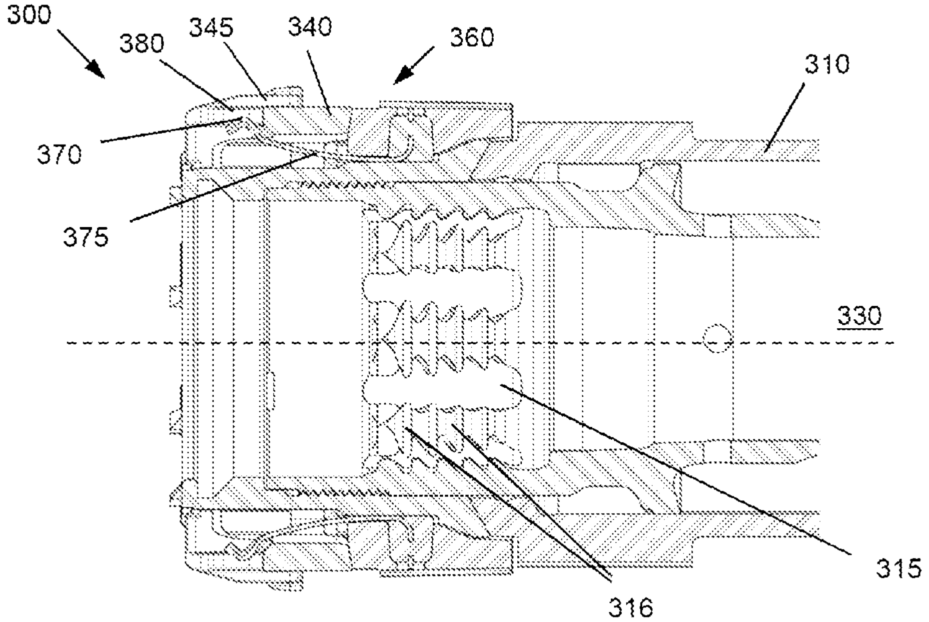
FIG. 5 shows a detail of the first module from FIG. 4 with the second module removed.
Figure 6:
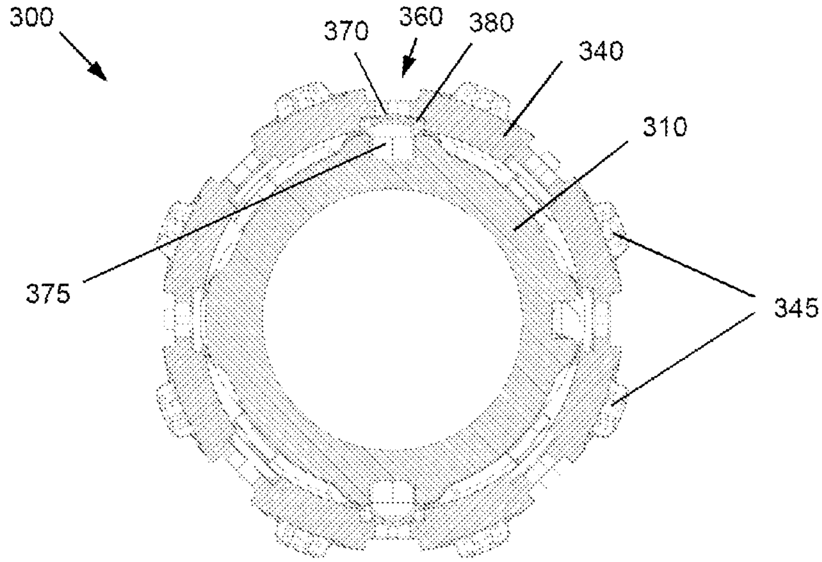
FIG. 6 shows a detail of a power tool in a cross section.

In FIGS. 3, 4, 5 and 6, a power tool 300 is shown as a detail in a longitudinal section (FIGS. 3, 4 and 5) and a cross section (FIG. 6). The power tool comprises a first module 310, for example a setting module, and a second module 320, for example a magazine module. The first module 310 and the second module 320 are inserted in one another along an insertion axis 330 defining a direction of insertion. For this purpose, the first module 310 has an insert fitting 315, while the second module 320 has an insert part 325, which can be inserted into the insert fitting 315 along the insertion axis 330. In this case, the insert part 325 in the insert fitting 315 can be turned in a direction of rotation about the insertion axis 330 between an inhibiting position (FIG. 3) and a passing position (FIG. 4), wherein the insert fitting 315 has a number of first projections 316, following one another in the direction of insertion, and the insert part 325 has a number of second projections 326, following one another in the direction of insertion In the inhibiting position, a second projection 326 respectively engages behind a first projection 316 in the direction of the insertion axis 330, and in the passing position the first projections 316 can pass the respective second projections 326 in the direction of the insertion axis 330.

The first module 310 has a pressing inhibiting element 340, which is moved along with the second module 320, and a pressing blocking element 350 (FIG. 1). The pressing inhibiting element 340 is formed as a sleeve arranged around the insertion axis 330 and can be turned with respect to the pressing blocking element 350 about the insertion axis 330 between a normal position, shown in FIG. 3, and a detaching position, shown in FIG. 4. In the normal position, the second module 320 is held against the first module by means of the first and second projections 316, 326. In the detaching position, the second module 320 can be removed from the first module 310 if a locking that is not shown is unlocked, for example manually. The pressing inhibiting element 340 has a pressing inhibiting contour 345, which comprises a multiplicity of radially protruding projections and the movement of which along the insertion axis 330 is blocked by a blocking contour 355 (FIG. 1) of the pressing blocking element 350 when the pressing inhibiting element 340 is in the detaching position (FIG. 4). As a result, the pressing blocking element 350 only allows the pressing inhibiting element 340 to be transferred along the insertion axis 330 toward the rest of the first module 310 into a pressing position when the pressing inhibiting element 340 is in the normal position, whereas the pressing blocking element 350 blocks the pressing inhibiting element 340 from being transferred into the pressing position when the pressing inhibiting element 340 is in the detaching position.

Furthermore, the first module 310 has a latching mechanism 360, which brings about latching engagement of the pressing inhibiting element 340 in the detaching position when the second module 320 is removed from the first module 310 (FIG. 5). This ensures that the pressing inhibiting element 340 remains in the detaching position, and consequently the pressing inhibiting element 340 is blocked from being transferred into the pressing position by the pressing blocking element 350 when the second module 320 has been removed from the first module 310. The latching mechanism 360 comprises a latching element 370, which is arranged, and in particular fastened, on the rest of the first module 310, and a latching fitting 380, which is arranged on the pressing inhibiting element 340 and in particular is formed as a radial depression or radial opening in the pressing inhibiting element 340. The latching element 370 engages in the latching fitting 380 in order to bring about latching engagement of the pressing inhibiting element 340 in the detaching position, in particular when the second module 320 has been removed from the first module 310

(FIG. 5). The latching mechanism 360 comprises a latching spring 375, which loads the latching element 370 toward the latching fitting 380. Preferably, the latching element 370 and the latching spring 375 are formed in one piece, in the present example as a leaf spring.

The second module 320 has a covering element 390, which covers the latching fitting 380, at least in the detaching position, in order to prevent engagement of the latching element 370 in the latching fitting 380 when the second module 320 is held against the first module 310. As a result, easy turning of the pressing inhibiting element 340, and consequently of the second module 320, from one normal position into the next normal position is facilitated, because in the detaching position therebetween the latching element 370 does not engage in the latching fitting 380. Latching engagement only takes place when the second module 320 is removed from the first module 310, and consequently the covering element 390 exposes the latching fitting 380. The covering element 390 is formed as a driver, which engages in the latching fitting 380 in order to transfer a rotational movement of the second module 320 about the insertion axis 330 onto the pressing inhibiting element 340 when the second module 320 is held against the first module 310. Turning of the insert part 325 from the inhibiting position into the passing position in this case brings about turning at the same time of the pressing inhibiting element 340 from the normal position into the detaching position. Similarly, turning of the insert part 325 from the passing position into the inhibiting position brings about turning at the same time of the pressing inhibiting element 340 from the detaching position into the normal position.

The invention has been described with reference to a number of exemplary embodiments of a setting tool. It goes without saying that all the features of the individual exemplary embodiments can also be realized in a single device in any desired combination, as long as they are not mutually contradictory. It should also be noted that the invention is also suitable for other applications, in particular for screwdriving tools or hammer drills and the like.

The invention claimed is:

1. A power tool, comprising a first module and a second module which can be removed from the first module, wherein the first and second modules can be inserted into one another along an insertion axis defining a direction of insertion, wherein the first module has a pressing inhibiting element, which is moved along with the second module, and a pressing blocking element, wherein the pressing inhibiting element can be turned with respect to the pressing blocking element about the insertion axis between a normal position and a detaching position, wherein the second module is held against the first module in the normal position and can be removed from the first module in the detaching position, wherein the pressing blocking element allows the pressing inhibiting element to be moved along the insertion axis toward a remainder of the first module into a pressing position when the pressing inhibiting element is in the normal position, wherein the pressing blocking element blocks the pressing inhibiting element from being moved into the pressing position when the pressing inhibiting element is in the detaching position, and wherein the first module has a latching mechanism which brings about latching engagement of the pressing inhibiting element with the remainder of the first module in the detaching position when the second module is removed from the first module.

2. The power tool as claimed in claim 1, wherein the latching mechanism comprises a latching element on the remainder of the first module and a latching fitting on the pressing inhibiting element, or vice versa, and wherein the latching element engages in the latching fitting in order to bring about latching engagement of the pressing inhibiting element with the remainder of the first module in the detaching position.

3. The power tool as claimed in claim 2, wherein the latching mechanism comprises a latching spring which loads the latching element toward the latching fitting.

4. The power tool as claimed in claim 2, wherein the second module has a covering element which covers the latching fitting in order to prevent engagement of the latching element in the latching fitting when the second module is held against the first module.

5. The power tool as claimed in claim 4, wherein the covering element is formed as a driver which engages in the latching fitting in order to transfer a rotational movement of the second module about the insertion axis onto the pressing inhibiting element when the second module is held against the first module.

6. The power tool as claimed in claim 1, wherein the first module has an insert fitting and the second module has an insert part that can be inserted into the insert fitting along the insertion axis, or vice versa.

7. The power tool as claimed in claim 6, wherein the insert part in the insert fitting can be turned in a direction of rotation about the insertion axis between an inhibiting position and a passing position, wherein the insert fitting has a plurality of first projections following one another in the direction of insertion, and the insert part has a plurality of second projections following one another in the direction of insertion, wherein in the inhibiting position one of the second projections respectively engages behind one of the first projections in the direction of insertion, and wherein in the passing position the first projections allow the second projections to pass in the direction of insertion.

8. The power tool as claimed in claim 1, wherein the pressing inhibiting element has a pressing inhibiting contour, a movement of which along the insertion axis is blocked by the pressing blocking element when the pressing inhibiting element is in the detaching position.

9. The power tool as claimed in claim 1, wherein the pressing inhibiting element comprises a sleeve arranged around the insertion axis.

10. The power tool as claimed in claim 1, wherein the power tool has a driving-in element for transferring energy to a fastening element to be driven in, and a power-operated driving device for driving the driving-in element.

11. The power tool as claimed in claim 10, wherein the first module comprises the driving device, the driving-in element, a guiding cylinder for the driving-in element, and/or an operating element.

12. The power tool as claimed in claim 10, wherein the second module comprises the driving-in element, a guiding cylinder for the driving-in element, an operating element, and/or a magazine for the fastening element.

13. The power tool as claimed in claim 3, wherein the second module has a covering element which covers the latching fitting in order to prevent engagement of the latching element in the latching fitting when the second module is held against the first module.

14. The power tool as claimed in claim 13, wherein the covering element is formed as a driver which engages in the latching fitting in order to transfer a rotational movement of the second module about the insertion axis onto the pressing inhibiting element when the second module is held against the first module.

15. The power tool as claimed in claim 2, wherein the first module has an insert fitting and the second module has an insert part that can be inserted into the insert fitting along the insertion axis, or vice versa.

16. The power tool as claimed in claim 2, wherein the pressing inhibiting element has a pressing inhibiting contour, a movement of which along the insertion axis is blocked by the pressing blocking element when the pressing inhibiting element is in the detaching position.

17. The power tool as claimed in claim 2, wherein the pressing inhibiting element comprises a sleeve arranged around the insertion axis.

18. The power tool as claimed in claim 2, wherein the power tool has a driving-in element for transferring energy to a fastening element to be driven in, and a power-operated driving device for driving the driving-in element.

19. The power tool as claimed in claim 18, wherein the first module comprises the driving device, the driving-in element, a guiding cylinder for the driving-in element, and/or an operating element.

20. The power tool as claimed in claim 18, wherein the second module comprises the driving-in element, a guiding cylinder for the driving-in element, an operating element, and/or a magazine for the fastening element.

* * * * *